United States Patent [19]

Sack

[11] 4,259,118

[45] Mar. 31, 1981

[54] THERMALLY HIGH PRE-STRESSABLE GLASS WITH HIGH HOT STRESSING FACTORS

[75] Inventor: Werner Sack, Mainz, Fed. Rep. of Germany

[73] Assignee: Jenaer Glaswerk Schott & Gen., Mainz, Fed. Rep. of Germany

[21] Appl. No.: 146,318

[22] Filed: May 5, 1980

Related U.S. Application Data

[63] Continuation of Ser. No. 971,036, Dec. 19, 1978, abandoned.

[30] Foreign Application Priority Data

Dec. 19, 1977 [DE] Fed. Rep. of Germany ....... 2756555

[51] Int. Cl.$^3$ ................................ C03C 3/08
[52] U.S. Cl. ....................................... 106/54
[58] Field of Search ........................................ 106/54

[56] References Cited

U.S. PATENT DOCUMENTS

| | | | |
|---|---|---|---|
| 2,068,801 | 1/1957 | Hood | 156/54 |
| 3,326,703 | 6/1967 | Harrington | 156/54 |
| 3,784,387 | 1/1974 | Sack | 156/54 |
| 3,984,252 | 10/1976 | Kiefer | 156/54 |
| 4,001,741 | 1/1977 | Lindig et al. | 156/54 |

*Primary Examiner*—O. R. Vertiz
*Assistant Examiner*—Mark Bell

*Attorney, Agent, or Firm*—Haight, Rosfeld, Noble & Santa Maria

[57] ABSTRACT

Glass compositions have been found which, with a low linear thermal expansion coefficient of $33.9-53.2\times10^{-7}/°C.$ at 20–300° C. will pre-stress to a much higher extent under similar prestressing conditions than known glasses of the same thermal expansion, and which consequently result in crumbling under forced fracture. The glasses possess the following properties: the transformation temperatures (Tg) are between 566° and 660° C., the softening temperatures (Ew) are between 821° and 845° C. and working temperatures are between 1211° and 1370° C., the temperature differential Ew-Tg being 232° to 298° C., the ratio $\alpha'/\alpha$ of the thermal expansion coefficient above Tg ($\alpha'$) to expansion below Tg ($\alpha$) being between 4.1 and 9.4 and the formation comprising:

| | |
|---|---|
| $SiO_2$ | 61.60–79.50 percent by weight |
| $B_2O_3$ | 1.00–10.50 |
| $Al_2O_3$ | 2.50–14.00 |
| $Na_2O$ | 1.50–6.00 |
| CaO | 0–4.20 |
| MgO | 0–3.19 |
| BaO | 0–9.60 |
| ZnO | 0–12.00 |
| Total CaO + MgO BaO + ZnO | 3.20–17.90 |
| $ZrO_2$ | 0–1.50 |
| $As_2O_3$ | 0–0.50 |
| NaCl | 0–0.75 |

4 Claims, No Drawings

THERMALLY HIGH PRE-STRESSABLE GLASS WITH HIGH HOT STRESSING FACTORS

This is a continuation of application Ser. No. 971,036 filed Dec. 19, 1978, now abandoned.

BACKGROUND OF THE INVENTION

This invention relates to glass compositions having a high heat stress factor. More particularly, the present invention concerns thermally high pre-stressable strength and consequently high mechanical strength-glasses (high $\sigma_{B\,B}$-values), simultaneously featuring low heat expansion coefficients due to high temperature shock resistance or, in other words featuring high hot stressing factors.

When expressing the serviceability of partly heated glass objects, the heat stress factor as outlined below $$R = \frac{\sigma_B x (1-\mu)}{\alpha x E}$$

(please see "Die Keramik", by Salmang-Scholze, Springer Verlag, Berlin, 1968, p. 334 et seq.), is more informative than the separate evaluation of $\sigma_B$ and $\alpha$. The greater is the value for R, the higher the resistance against partial heating.

Within this formula, the symbols have the following meaning:

$\sigma_B$ = bending tensile strength ($kp/cm^2$) with undamaged surface or surface broached with wet 220 grain emery. In the latter case, the values are approximately 400 $kp/cm^2$ lower than the values obtained on undamaged test-piece surfaces.

$\mu$ = transverse contraction index—approximately 0.20 for silicate glasses $\alpha$ = mean linear thermal expansion coefficient in the temperature range of 20°–300° C.

E = elasticity modulus ($kp/cm^2$): between approximately 6.5 and $9.0 \times 10^5$ $kp/cm^2$ for silicate glasses.

Of these four values determining the heat stress factor R, $\sigma_B$ and $\alpha$ are of particular importance. Under approximately constant $\mu$-values and limited differences in E-modulus for the glasses according to the invention, R is determined practically alone by those values. It follows from this that temperature shock-resistant glasses with high R-values are only obtained where $\alpha$ is low and $\sigma_B$ is high. Practice shows that this aim has so far only been achieved with low heat expansion glasses even where, as in the case of borosilicate glass with an $\alpha/300$ value of approximately $33 \times 10^{-7}$/°C., the glasses allow a less pronounced thermal pre-stress (pressure stress produced in the glass surface) than glasses with a high thermal expansion, such as window glass (float glass) with an $\alpha/300$-value of approximately $90 \times 10^{-7}$/°C.

It must be recalled here that glasses with a high thermal expansion do not lend themselves easily to high pressure pre-stressing. The limit results from the fact that the equivalent tensile stress, automatically created within the glass during pre-stressing, must not exceed the basic strength of the glass as predetermined by internal defects such as bubbles, waviness and the like, since a fracture will otherwise occur. (Whenever glass breaks, this is invariably because of excessive tensile stresses, since the compression strength of glass is some 10 times greater than the tensile strength).

The specific pre-stressability (hardenability) is also dependent upon the linear thermal expansion coefficient of the glass; the surface compression stress achieved is approx. 400 $kp/cm^2$ for the above borosilicate glass and approx. 1200 $kp/cm^2$ for window glass, as determined upon $50 \times 20 \times 5$ mm laboratory samples.

OBJECTS OF THE INVENTION

Accordingly, it is a general object of the present invention to provide improved thermally high pre-stressable glass compositions.

Another object of the present invention is to provide a method for the production of such glass compositions which possess high heat stress factors.

Upon study of the specification and appended claims, further objects, features and advantages of the present invention will become more fully apparent to those skilled in the art to which this invention pertains.

SUMMARY OF THE INVENTION

Briefly, the above and other objects, features and advantages of the present invention are attained in one aspect thereof by providing glass compositions characterized as follows in percentages by weight:

| | |
|---|---|
| $SiO_2$ | 61.60–79.50 |
| $B_2O_3$ | 1.00–10.50 |
| $Al_2O_3$ | 2.50–4.00 |
| $Na_2O_3$ | 1.50–6.00 |
| CaO | 0–4.20 |
| MgO | 0–3.10 |
| BaO | 0–9.60 |
| ZnO | 0–12.00 |
| total CaO + MgO + BaO + ZnO | 3.20–17.90 |
| $ZrO_2$ | 0–1.50 |
| $As_2O_3$ | 0–0.50 |
| NaCl | 0–0.75 | and besides good chemical resistance and high devitrification strength, they have the following properties:

| | |
|---|---|
| $\alpha \times 10^7$ (20–300° C.)/°C. | = 33.90–53.20 |
| $\alpha' \times 10^7$/°C. above Tg | = 149.80–367.90 |
| $\alpha'/\alpha$ | = 4.10–9.40 |
| Tg (°C.); approx. $10^{13.5p}$ | = 566–660. |
| Ew (°C.); = $10^{7.6p}$ | = 821–945. |
| $V_A$ (°C.); = $10^{4p}$ | = 1211–1370. |
| Ew - Tg (°C.) | = 232–298. |
| density | = 2.30–3.02 |
| R, thermal stress factor | >300. |

DETAILED DESCRIPTION

The mechanical strength of thermally pre-stressed glass (as obtained by various procedures, for instance compressed air blowing of the hot glass component or quenching in an oilbath) results from basic strength (usually 700–800 $kp/cm^2$ for most silicate glasses with an undamaged surface and in the stress-relieved state) and from the compression prestressing (increased strength due to this specific prestressability/ability to strengthening). In the case of compression prestressed borosilicate and window glasses as shown above, tests show $\sigma_B$-values on the borosilicate glasses of 700–800+400=1100–1200 $kg/cm^2$ whereas the window glasses show 700–800+1200=1900–2000 $kp/cm^2$. Taking into account the $\alpha$, $\mu$ and E values for the samples, the R-values for the borosilicate glass are 429–468 and those for the window glass are 216–227.

The tensile strength $\sigma_B$ in the unstressed and prestressed condition for technical products manufactured from these glasses (e.g. flat glass) exceeds the above values. This is of no importance in the present case, since it is only intended to show the relationship between the various glasses as determined from the values for laboratory glass melts.

All values determining the thermal stress factor R will thus finally control the resistance to partial heating, and the above figures clearly show that borosilicate glass is superior to window-glass from this viewpoint, even though the specific prestressability of the glass does not suffice to achieve crumbling on fracture (low $\alpha$-values induce a high temperature shock resistance and high $\sigma_B$ values induce a high mechanical strength, in conjunction with an increasing tendency towards crumbling under forced fracture).

Most surprisingly, glass compositions have been found which, with a low linear thermal expansion coefficient $\alpha$ of $33.9$–$53.2 \times 10^{-7}/°C$. at $20°$–$300°$ C. will pre-stress to a much higher extent under similar prestressing conditions than known glasses of the same thermal expansion, and which consequently result in crumbling under forced fracture.

The thermal stress factors R for the new glasses are within the order of magnitude of the R-value as recorded for the above-named borosilicate glass. Consequently, in conjunction with the higher prestressability, they are superior to the borosilicate and the window glasses. For many applications it is particularly useful for safety purposes to achieve numerous small fragments (crumbling) as a result of a fracture, instead of a few large fragments. The difference in relation to the state of the art is also clearly emphasized by four very important properties, which are achieved simultaneously and exclusively by the glasses in according to the invention, as follows:

1. $\alpha'/\alpha \geq 4.0$; i.e., to achieve a high compression prestressing (high $\sigma_B$) the ratio of thermal expansion coefficent $\alpha'$ above transformation temperature (Tg) to the thermal expansion coefficient below Tg is decisive. $\alpha$-values at $20°$–$300°$ C. (viz. below Tg) do not suffice alone to obtain an optimum compression prestressing . 2. Softening point of glasses Ew ($\rho = 10^{7.6}$ poise) $>820°$.

3. Thermal stress factor R is greater than 300 for undamaged glass surfaces and under a quench blowing pressure of 1 bar.

4. Ew $-$ Tg $= 232°$–$298°$ C.

Without further elaboration, it is believed that one skilled in the art can, using the proceding description, utilize the present invention to its fullest extent. The following preferred specific embodiments are, therefore, to be construed as merely illustrative and not limitative of the remainder of the disclosure in any way whatsoever. All temperatures are set forth uncorrected in degrees Celsius; unless otherwise indicated, all pressures are ambient and all parts and percentages are by weight. The following tables show the superiority of the range of compositions according to the invention as compared with the previously cited borosilicate and window glasses.

Prefered compositions illustrated in the following examples are those having a high $SiO_2$ content together with a low $Al_2O_3$ content, i.e. thermally high prestressable glasses with high temperature shock resistance and thermal expansions coefficients in the temperature range $20°$–$300°$ C. of from $37.8$ to $53.1 \times 10^{-7}/°C$., characterized in that the transformation temperatures (Tg) are from $571°$ to $608°$ C., the softening temperatures (Ew) are from $821°$ to $897°$ C., the working temperatures ($V_A$) are from $1211°$ to $1355°$ C., the temperature differential Ew–Tg is from $232°$ to $294°$ C., the thermal stress factor R is greater than 300 for undamaged glass surfaces under a quench blowing pressure of one bar and the ratio $\alpha'/\alpha$ of the thermal expansion coefficient above Tg ($\alpha'$) to expansion below Tg ($\alpha$) is from 4.6 to 9.4 whereby said glass exhibits a high compression prestessing and crumbles into small pieces upon forced fracture, wherein the composition of said glasses, in oxides percent by weight, consists essentially of:

| | |
|---|---|
| $SiO_2$ | 73.40–79.50 |
| $B_2O_3$ | 1.00–10.50 |
| $Al_2O_3$ | 2.50–9.00 |
| $Na_2O$ | 4.00–6.00 |
| CaO | 0–3.00 |
| MgO | 0–2.10 |
| BaO | 0–9.60 |
| ZnO | 0–5.10 |
| total CaO + MgO + BaO + ZnO | 3.20–13.50 |
| $ZrO_2$ | 0–1.50 |
| $As_2O_3$ | 0–0.50 and |
| NaCl | 0–0.75. |

A second group of preferred glass compositions in accordance with the present invention are those having both a high $Al_2O_3$ content of about 14 percent and an $As_2O_3$ content of about 0.30 percent, i.e. thermally high prestressable glasses with high temperature shock resistance and thermal expansion coefficients in the temperature range $20°$–$300°$ C. of from $33.9$ to $42.3 \times 10^{-7}/°C$., characterized in that the transformation temperatures (Ig) are from $623°$ to $660°$ C., the softening temperatures (Ew) are from $909°$ to $945°$ C., the working temperatures ($V_A$) are from $1272°$ to $1370°$ C., the temperature differential Ew–Tg is from $249°$ to $297°$ C., the thermal stress factor R is greater than 300 for undamaged glass surfaces under a quench blowing pressure of one bar and the ratio $\alpha'/\alpha$ of the thermal expansion coefficient above Tg ($\alpha'$) to expansion below Tg ($\alpha$) is from 4.1 to 6.8 whereby said glass exhibits a high compression prestressing and crumbles into small pieces upon forced fracture, wherein the composition of said glasses, in oxides percent by weight, consists essentially of:

| | |
|---|---|
| $SiO_2$ | 61.60–65.00 |
| $B_2O_3$ | 6.20–10.00 |
| $Al_2O_3$ | 14.00 |
| $Na_2O$ | 1.50–4.00 |
| CaO | 2.50–4.00 |
| MgO | 1.70–1.80 |
| BaO | 2.00–4.50 |
| ZnO | 0–6.50 |
| total CaO + MgO + BaO + ZnO | 7.00–16.70 and |
| $As_2O_3$ | 0.30. |

A third group of preferred glass compositions in accordance with the present invention has an $Al_2O_3$ content of about 10 percent and an $As_2O_3$ content of about 0.30 percent, i.e. thermally high prestressable glasses with high temperature shock resistance and thermal expansion coefficient in the temperature range $20°$–$300°$ C. of from $46.1$ to $53.2 \times 10^{-7}/°C$., characterized in that the transformation temperatures (Tg) are from $596°$ to $621°$ C., the softening temperatures (Ew) are from $859°$ to $885°$ C., the working temperatures ($V_A$) are from $1288°$ to $1355°$ C., the temperature differential Ew-Tg is from 248° to 271° C., the thermal stress factor R is greater than 300 for undamaged glass surfaces under a quench blowing pressure of one bar and the ratio $\alpha'/\alpha$ of the thermal expansion coefficient above Tg ($\alpha'$) to expansion below Tg ($\alpha$) is from 4.3 to 5.8 whereby said glass exhibits a high compression prestressing and crumbles into small pieces upon forced fracture, wherein the composition of said glasses, in oxides percent by weight, consists essentially of:

| | |
|---|---|
| $SiO_2$ | 66.70–70.70 |
| $B_2O_3$ | 4.50–10.30 |
| $Al_2O_3$ | 10.00 |
| $Na_2O$ | 4.50–5.50 |
| CaO | 2.20–4.20 |
| MgO | 1.70–3.10 |
| BaO | 1.50–3.50 |
| ZnO | 0–3.00 |
| total CaO + MgO + BaO + ZnO | 8.50–10.30 and |
| $As_2O_3$ | 0.30. |

A fourth group of preferred glass compositions in accordance with the present invention as an $Al_2O_3$ content of 6.00 percent and an $As_2O_3$ content of about 0.30 to 0.50 percent and a relatively high ZnO content of about 9.00 to 12.00 percent, i.e thermally high prestressable glasses with high temperative shock resistance and thermal expansion coefficients in the temperature range 20°–300° C. of from 44.9 to $46.2 \times 10^{-7}/°C$., characterized in that the transformation temperaturess (Tg) are from 566° to 575° C., the softening temperatures (Ew) are from 844° to 864° C., the working temperatures ($V_A$) are from 1239° to 1287° C., the temperatures differential Ew–Tg is from 274° to 298° C., the thermal stress factor R is greater than 300 for undamaged glass surfaces under a quench blowing pressure of one bar and the ratio $\alpha'/\alpha$ of the thermal expansion coefficient above Tg ($\alpha'$) to expansion below Tg ($\alpha$) is from 5.0 to 5.7 whereby said glass exhibits a high compression prestressing and crumbles into small pieces upon forced fracture, wherein the composition of said glasses, in oxides percent by weight, consists essentially of:

| | |
|---|---|
| $SiO_2$ | 65.70–68.70 |
| $B_2O_3$ | 6.00–6.30 |
| $Al_2O_3$ | 6.00 |
| $Na_2O$ | 4.00–5.00 |
| BaO | 5.00–8.9 |
| ZnO | 9.00–12.00 |
| total BaO + ZnO | 14.00–17.90 and |
| $As_2O_3$ | 0.30–0.50. |

TABLE 1

Composition of Borosilicate-Glass and Window-Glass in % by Weight and Properties

| Composition/Properties | Borosilicate Glass | Window Glass (Float Glass) |
|---|---|---|
| $SiO_2$ | 80.5 | 73.0 |
| $B_2O_3$ | 12.8 | — |
| $Al_2O_3$ | 2.4 | 0.8 |
| $Na_2O$ | 3.6 | 14.0 |
| $K_2O$ | 0.7 | — |
| CaO | — | 8.7 |
| MgO | — | 3.5 |
| Total % | 100.0 | 100.0 |
| $\alpha \times 10^7$ (20–300° C.)/°C. | 33 | 88 |
| $\alpha' \times 10^7$/°C. (above Tg) | 126.4 | 229.7 |
| $\alpha'/\alpha$ | 3.9 | 2.6 |
| Tg (°C.) | 530 | 528 |
| Ew (°C.) | 815 | 724 |
| $V_A$ (°C.) | 1265 | 1033 |

TABLE 1-continued

Composition of Borosilicate-Glass and Window-Glass in % by Weight and Properties

| Composition/Properties | Borosilicate Glass | Window Glass (Float Glass) |
|---|---|---|
| Ew - Tg (°C.) | 285 | 196 |
| Density (g/cm$^3$) | 2.23 | 2.49 |
| $\mu$ | 0.19 | 0.25 |
| $\beta$ of 50 × 20 × 5mm test-pieces air-hardened at 1 bar, undamaged surface and polished (in kp/cm$^2$) | 1100–1200 | 1900–2000 |
| $E \times 10^{-5}$ (kp/cm$^2$) | 6.3 | 7.5 |
| R (thermal stressing coefficient) | 429–468 | 216–227 |

TABLE 2

Composition Examples Nos. 1–4 in % by Weight and Properties

| Composition/Properties | No. 1 | No. 2 | No. 3 | No. 4 |
|---|---|---|---|---|
| $SiO_2$ | 78.50 | 78.50 | 78.50 | 78.50 |
| $B_2O_3$ | 10.50 | 8.50 | 5.40 | 8.00 |
| $Al_2O_3$ | 3.50 | 4.00 | 3.50 | 3.50 |
| $ZrO_2$ | — | — | — | — |
| $Na_2O$ | 4.30 | 4.00 | 5.00 | 5.50 |
| CaO | 0.80 | 1.80 | — | 1.50 |
| MgO | 0.50 | 1.20 | — | 1.00 |
| BaO | 1.90 | 2.00 | 2.50 | 2.00 |
| ZnO | — | — | 5.10 | — |
| $As_2O_3$ | 0.30 | 0.50 | 0.15 | 0.50 |
| NaCl | 0.70 | 0.50 | 0.70 | — |
| Total % | 101.00 | 101.00 | 100.85 | 100.50 |
| $\alpha \times 10^7$ (20–300° C.)/°C. | 37.8 | 38.5 | 41.9 | 43.6 |
| $\alpha'$ (above Tg) | 254.3 | 338.4 | 224.0 | 323.3 |
| $\alpha'/\alpha$ | 6.7 | 8.8 | 5.3 | 7.4 |
| Tg (°C.); ca . $10^{13.5}$ | 576 | 593 | 571 | 578 |
| Ew (°C.; = $10^{7.6}$p) | 837 | 878 | 854 | 822 |
| $V_A$ (°C.); = $10^4$p | 1297 | 1345 | 1327 | 1245 |
| Ew - Tg (°C.) | 261 | 285 | 283 | 244 |
| Density (g/cm$^3$) | 2.30 | 2.33 | 2.40 | 2.36 |
| $\mu$ | 0.19 | — | — | — |
| $E \times 10^{-5}$ (kp/cm$^2$) | 7.04 | — | — | — |
| $\sigma_B$ of 50 × 30 × 5mm test-pieces air-hardened at 1 bar, undamaged surface and polished (kp/cm$^2$) | 1548 | — | — | — |
| R (heat stress factor) | 470 | — | — | — |

Composition Examples Nos. 5–8 in % by Weight and Properties

| Composition/Properties | No. 5 | No. 6 | No. 7 | No. 8 |
|---|---|---|---|---|
| $SiO_2$ | 79.50 | 78.50 | 78.50 | 78.50 |
| $B_2O_3$ | 8.00 | 6.10 | 5.20 | 6.50 |
| $Al_2O_3$ | 2.50 | 3.50 | 3.50 | 3.50 |
| $ZrO_2$ | — | — | — | — |
| $Na_2O$ | 5.50 | 5.00 | 5.30 | 5.30 |
| CaO | 1.50 | 2.40 | 3.00 | 2.40 |
| MgO | 1.00 | 1.70 | 2.10 | 1.60 |
| BaO | 2.00 | 2.80 | — | 2.00 |
| ZnO | — | — | 2.50 | — |
| $As_2O_3$ | 0.15 | 0.25 | | |
| NaCl | 0.60 | 0.75 | 0.50 | 0.50 |
| Total % | 100.75 | 101.00 | 100.50 | 100.50 |
| $\alpha \times 10^7$ (20–300° C.)/°C. | 44.3 | 44.9 | 45.4 | 45.8 |
| $\alpha'$ (above Tg) | 291.9 | 333.0 | 328 | 361.4 |
| $\alpha'/\alpha$ | 6.6 | 7.2 | 7.2 | 7.9 |
| Tg (°C.); ca . $10^{13.5}$ | 574 | 582 | 582 | 581 |
| Ew (°C.; = $10^{7.6}$p) | 823 | 839 | 848 | 831 |
| $V_A$ (°C.); = $10^4$p | 1243 | 1290 | 1292 | 1270 |
| Ew - Tg (°C.) | 249 | 257 | 266 | 250 |
| Density (g/cm$^3$) | 2.35 | 2.38 | 2.37 | 2.37 |
| $\mu$ | — | 0.19 | — | 0.19 |

TABLE 2-continued

| | | | | |
|---|---|---|---|---|
| $E \times 10^{-5}$ (kp/cm$^2$) | — | 7.46 | — | 7.48 |
| $\sigma_B$ of 50 × 30 × 5mm test-pieces air-hardened at 1 bar, undamaged surface and polished (kp/cm$^2$) | — | 1787 | — | 1766 |
| R (heat stress factor) | — | 433 | — | 419 |

Composition Examples Nos. 9–12 in % by Weight and Properties

| Composition/Properties | No. 9 | No. 10 | No. 11 | No. 12 |
|---|---|---|---|---|
| SiO$_2$ | 78.50 | 78.50 | 77.50 | 78.50 |
| B$_2$O$_3$ | 1.00 | 5.10 | 5.10 | 5.10 |
| Al$_2$O$_3$ | 2.50 | 3.50 | 3.50 | 3.50 |
| ZrO$_2$ | — | — | 1.50 | — |
| Na$_2$O | 4.50 | 5.30 | 5.30 | 5.30 |
| CaO | 2.70 | — | 3.00 | 3.00 |
| MgO | 1.90 | — | 2.10 | 2.10 |
| BaO | 4.90 | 7.60 | 2.00 | 2.50 |
| ZnO | 4.00 | — | — | — |
| As$_2$O$_3$ | 0.25 | 0.25 | — | 0.30 |
| NaCl | 0.60 | 0.60 | 0.50 | 0.50 |
| Total % | 100.85 | 100.85 | 100.50 | 100.80 |
| $\alpha \times 10^7$ (20–300° C.)/°C. | 45.9 | 46.6 | 46.7 | 47.1 |
| $\alpha'$ (above Tg) | 212.3 | 438.7 | 345.2 | 369 |
| $\alpha'/\alpha$ | 4.6 | 9.4 | 7.4 | 7.8 |
| Tg (°C.); ca. $10^{13.5}$ | 591 | 591 | 594 | 584 |
| Ew (°C.; = $10^{7.6}$p) | 885 | 831 | 857 | 854 |
| V$_A$ (°C.); = $10^4$p | 1355 | 1254 | 1290 | 1271 |
| Ew - Tg (°C.) | 294 | 240 | 263 | 270 |
| Density (g/cm$^3$) | 2.47 | 2.45 | 2.40 | 2.38 |
| $\mu$ | — | — | — | 0.19 |
| $E \times 10^{-5}$ (kp/cm$^2$) | — | — | — | 7.50 |
| $\sigma_B$ of 50 × 30 × 5mm test-pieces air-hardened at 1 bar, undamaged surface and polished (kp/cm$^2$) | — | — | — | — |
| R (heat stress factor) | — | — | — | — |

Composition Examples Nos. 13–16 in % by Weight and Properties

| Composition/Properties | No. 13 | No. 14 | No. 15 | No. 16 |
|---|---|---|---|---|
| SiO$_2$ | 78.50 | 77.00 | 78.50 | 75.00 |
| B$_2$O$_3$ | 4.10 | 5.10 | 2.50 | 5.10 |
| Al$_2$O$_3$ | 3.50 | 5.00 | 3.50 | 9.00 |
| ZrO$_2$ | — | — | — | — |
| Na$_2$O | 5.30 | 5.30 | 5.30 | 6.00 |
| CaO | 2.40 | 3.00 | 2.40 | 2.90 |
| MgO | 1.70 | 2.10 | 1.70 | 2.00 |
| BaO | 4.50 | 2.50 | 6.10 | — |
| ZnO | — | — | — | — |
| As$_2$O$_3$ | 0.25 | — | 0.30 | 0.10 |
| NaCl | 0.60 | 0.50 | 0.50 | 0.50 |
| Total % | 100.85 | 100.55 | 100.80 | 100.60 |
| $\alpha \times 10^7$ (20–300° C.)/°C. | 47.5 | 48.2 | 48.8 | 49.8 |
| $\alpha'$ (above Tg) | 347.2 | 311 | 308 | 265 |
| $\alpha'/\alpha$ | 7.3 | 6.4 | 6.3 | 5.3 |
| Tg (°C.); ca. $10^{13.5}$ | 588 | 593 | 586 | 608 |
| We (°C.; = $10^{7.6}$p) | 854 | 848 | 858 | 897 |
| V$_A$ (°C.); = $10^4$p | 1287 | 1281 | 1314 | 1344 |
| Ew - Tg (°C.) | 266 | 255 | 272 | 289 |
| Density (g/cm$^3$) | 2.41 | 2.39 | 2.44 | 2.35 |
| $\mu$ | 0.19 | 0.19 | — | — |
| $E \times 10^{-5}$ (kp/cm$^2$) | 7.52 | 7.36 | — | — |
| $\sigma_B$ of 50 × 30 × 5mm test-pieces air-hardened at 1 bar, undamaged surface and polished (kp/cm$^2$) | 1871 | 1781 | — | — |
| R (heat stress factor) | 425 | 407 | — | — |

Composition Examples Nos. 17–20 in % by Weight and Properties

| Composition/Properties | No. 17 | No. 18 | No. 19 | No. 20 |
|---|---|---|---|---|
| SiO$_2$ | 78.50 | 77.00 | 75.50 | 73.40 |
| B$_2$O$_3$ | 1.00 | 4.10 | 5.10 | 5.10 |
| Al$_2$O$_3$ | 3.50 | 3.50 | 3.50 | 3.50 |
| ZrO$_2$ | — | — | — | — |
| Na$_2$O | 5.30 | 5.80 | 5.30 | 5.30 |
| CaO | 2.40 | — | 3.00 | 3.00 |
| MgO | 1.70 | — | 2.10 | 2.10 |
| BaO | 7.60 | 9.60 | 5.50 | 7.60 |
| ZnO | — | — | — | — |
| As$_2$O$_3$ | 0.25 | 0.25 | 0.25 | 0.25 |
| NaCl | 0.60 | 0.60 | 0.60 | 0.60 |
| Total % | 100.85 | 100.85 | 100.85 | 100.85 |
| $\alpha \times 10^7$ (20–300° C.)/°C. | 50.0 | 50.3 | 50.9 | 53.1 |
| $\alpha'$ (above Tg) | 258 | 368 | 372 | 322.7 |
| $\alpha'/\alpha$ | 5.2 | 7.3 | 7.3 | 6.1 |
| Tg (°C.); ca. $10^{13.5}$ | 593 | 589 | 588 | 589 |
| Ew (°C.; = $10^{7.6}$p) | 876 | 851 | 826 | 821 |
| V$_A$ (°C.); = $10^4$p | 1322 | 1257 | 1238 | 1211 |
| Ew - Tg (°C.) | 283 | 263 | 238 | 232 |
| Density (g/cm$^3$) | 2.46 | 2.47 | 2.45 | 2.49 |
| $\mu$ | — | — | — | — |
| $E \times 10^{-5}$ (kp/cm$^2$) | — | — | — | — |
| $\sigma_B$ of 50 × 30 × 5mm test-pieces air-hardened at 1 bar, undamaged surface and polished (kp/cm$^2$) | — | — | — | — |
| R (heat stress factor) | — | — | — | — |

TABLE 3

Composition Examples Nos. 21–24 in % by Weight and Properties

| Composition/Properties | No. 21 | No. 22 | No. 23 | No. 24 |
|---|---|---|---|---|
| SiO$_2$ | 65.0 | 61.60 | 65.00 | 65.00 |
| B$_2$O$_3$ | 10.00 | 6.20 | 10.00 | 10.00 |
| Al$_2$O$_3$ | 14.00 | 14.00 | 14.00 | 14.00 |
| Na$_2$O | 2.00 | 1.50 | 2.50 | 4.00 |
| CaO | 2.50 | 4.00 | 2.50 | 2.50 |
| MgO | 1.80 | 1.70 | 1.80 | 1.80 |
| BaO | 2.00 | 4.50 | 4.20 | 2.70 |
| ZnO | 2.70 | 6.50 | — | — |
| As$_2$O$_3$ | 0.30 | 0.30 | 0.30 | 0.30 |
| Total % | 100.30 | 100.30 | 100.30 | 100.30 |
| $\alpha \times 10^7$ (20–300° C.)/°C. | 33.9 | 36.6 | 38.8 | 42.3 |
| $\alpha'$ (above Tg) | 164 | 149.8 | 206.4 | 286.8 |
| $\alpha'/\alpha$ | 4.9 | 4.1 | 5.3 | 6.8 |
| Tg (°C.) | 652 | 660 | 654 | 623 |
| Ew (°C.) | 945 | 909 | 935 | 920 |
| V$_A$ (°C.) | 1335 | 1272 | 1370 | 1340 |
| Ew - Tg (°C.) | 293 | 249 | 291 | 297 |
| Density (g/cm$^3$) | 2.40 | 2.54 | 2.40 | 2.37 |
| $\mu$ | — | 0.20 | — | — |
| $\sigma_B$ of B × 20 × 5mm test-pieces air-hardened at 1 bar, undamaged surface and polished (kp/cm$^2$) | — | 1910 | — | — |
| $E \times 10^{-5}$ (kp/cm$^2$) | — | 8.5 | — | — |
| R (heat stress factor) | — | 491 | — | — |

TABLE 4

Composition Examples Nos. 25–29 in % by Weight and Properties

| Composition Properties | No. 25 | No. 26 | No. 27 | No. 28 | No. 29 |
|---|---|---|---|---|---|
| SiO$_2$ | 66.70 | 70.70 | 70.70 | 69.70 | 69.70 |
| B$_2$O$_3$ | 10.30 | 5.80 | 5.80 | 4.80 | 4.50 |

TABLE 4-continued

Composition Examples Nos. 25-29 in % by Weight and Properties

| Composition Properties | No. 25 | No. 26 | No. 27 | No. 28 | No. 29 |
|---|---|---|---|---|---|
| Al$_2$O$_3$ | 10.00 | 10.00 | 10.00 | 10.00 | 10.00 |
| Na$_2$O | 4.50 | 5.00 | 5.00 | 5.50 | 5.50 |
| CaO | 2.30 | 2.20 | 3.10 | 3.70 | 4.20 |
| MgO | 1.70 | 1.80 | 2.40 | 2.80 | 3.10 |
| BaO | 2.00 | 1.50 | 3.00 | 3.50 | 3.00 |
| ZnO | 2.50 | 3.00 | | | |
| As$_2$O$_3$ | 0.30 | 0.30 | 0.30 | 0.30 | 0.30 |
| Total % | 100.30 | 100.30 | 100.30 | 100.30 | 100.30 |
| α × 10$^7$ (20-300° C.)/°C. | 46.1 | 46.4 | 49.6 | 52.4 | 53.2 |
| α' (above Tg) | 266.6 | 199.1 | 232.4 | 265.2 | 246.7 |
| α'/α | 5.8 | 4.3 | 4.7 | 5.1 | 4.6 |
| Tg (°C.) | 596 | 614 | 618 | 621 | 621 |
| Ew (°C.) | 859 | 885 | 873 | 869 | 873 |
| V$_A$ (°C.) | 1291 | 1355 | 1347 | 1303 | 1288 |
| Ew - Tg (°C.) | 263 | 271 | 255 | 248 | 252 |
| Density (g/cm$^3$) | 2.39 | 2.40 | 2.41 | 2.45 | 2.44 |
| μ | — | — | — | 0.205 | — |
| σ$_B$ of 50 × 20 × 5 mm test-pieces air-hardened at 1 bar, undamaged surface and polished (kp/cm$^2$) | — | — | — | 1910 | — |
| E × 10$^{-5}$ (kp/cm$^2$) | — | — | — | 7.52 | — |
| R (heat stress factor) | — | — | — | 385 | — |

TABLE 5

Composition Examples Nos. 30-33 in % by Weight and Properties

| Composition/Properties | No. 30 | No. 31 | No. 32 | No. 33 |
|---|---|---|---|---|
| SiO$_2$ | 65.70 | 67.00 | 66.00 | 68.70 |
| B$_2$O$_3$ | 6.10 | 6.00 | 6.10 | 6.30 |
| Al$_2$O$_3$ | 6.00 | 6.00 | 6.00 | 6.00 |
| Na$_2$O | 4.50 | 4.20 | 4.00 | 5.00 |
| BaO | 5.70 | 7.80 | 8.90 | 5.00 |
| ZnO | 12.00 | 9.00 | 9.00 | 9.00 |
| As$_2$O$_3$ | 0.50 | 0.50 | 0.50 | 0.30 |
| Total % | 100.50 | 100.30 | 100.50 | 100.30 |
| α × 10$^7$ (20-300° C.)/°C. | 44.9 | 45.2 | 45.6 | 46.2 |
| α' (above Tg) | 229.6 | 258.4 | 260.1 | 232.6 |
| α"/α | 5.1 | 5.7 | 5.7 | 5.0 |
| Tg (°C.) | 566 | 574 | 575 | 568 |
| Ew (°C.) | 864 | 848 | 855 | 844 |
| V$_A$ (°C.) | 1239 | 1287 | 1270 | 1287 |
| Ew - Tg (°C.) | 298 | 274 | 280 | 276 |
| Density (g/cm$^3$) | 3.02 | 2.57 | 3.02 | 2.51 |
| μ | — | 0.206 | — | — |
| σ$_B$ of 50 × 20 × 5mm test-pieces air-hardened at 1 bar, undamaged surface and polished (kp/cm$^2$) | — | 1465 | — | — |
| E × 10$^{-5}$ (kp/cm$^2$) | — | 7.23 | — | — |
| R (heat stress factor) | — | 356 | — | — |

The preceding examples can be repeated with similar success by substituting the generically or specifically described reactants and/or operating conditions of this invention for those specifically used in the examples. From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. Thermally high prestressable glasses with high temperative shock resistance and thermal expansion coefficients in the temperature range 20°-300° C. of from 37.8 to 53.1×10$^{-7}$/°C., characterized in that the transformation temperatures (Tg) are from 571° to 608° C., the softening temperatures (Ew) are from 821° to 897° C., the working temperatures (V$_A$) are from 1211° to 1355° C., the temperature differential Ew-Tg is from 232 to 294° C., the thermal stress factor R is greater than 300 for undamaged glass surfaces under a quench blowing pressure of one bar and the ratio α'/α of the thermal expansion coefficient above Tg (α') to expansion below Tg (α) is from 4.6 to 9.4 whereby said glass exhibits a high compression prestressing and crumbles into small pieces upon forced fracture, wherein the composition of said glasses, in oxides percent by weight, consists essentially of:

| SiO$_2$ | 73.40-79.50 |
|---|---|
| B$_2$O$_3$ | 1.00-10.50 |
| Al$_2$O$_3$ | 2.50-9.00 |
| Na$_2$O | 4.00-6.00 |
| CaO | 0-3.00 |
| MgO | 0-2.10 |
| BaO | 0-9.60 |
| ZnO | 0-5.10 |
| total CaO + MgO + BaO + ZnO | 3.20-13.50 |
| ZrO$_2$ | 0-1.50 |
| As$_2$O$_3$ | 0-0.50 and |
| NaCl | 0-0.75. |

2. Thermally high prestressable glasses with high temperative shock resistance and thermal expansion coefficients in the temperature range 20°-300° C. of from 33.9 to 42.3×10$^{-7}$/°C., characterized in that the transformation temperatures (Tg) are from 623° to 660° C., the softening temperatures (Ew) are from 909° to 945° C., the working temperatures (V$_A$) are from 1272° to 1370° C., the temperature differential Ew-Tg is from 249 to 297° C., the thermal stress factor R is greater than 300 for undamaged glass surfaces under a quench blowing pressure of one bar and the ratio α'/α of the thermal expansion coefficient above Tg (α') to expansion below Tg (α) is from 4.1 to 6.8 whereby said glass exhibits a high compression prestressing and crumbles into small pieces upon forced fracture, wherein the composition of said glasses, in oxides percent by weight, consists essentially of:

| SiO$_2$ | 61.60-65.00 |
|---|---|
| B$_2$O$_3$ | 6.20-10.00 |
| Al$_2$O$_3$ | 14.00 |
| Na$_2$O | 1.50-4.00 |
| CaO | 2.50-4.00 |
| MgO | 1.70-1.80 |
| BaO | 2.00-4.50 |
| ZnO | 0-6.50 |
| total CaO + MgO + BaO + ZnO | 7.00-16.70 and |
| As$_2$O$_3$ | 0.30. |

3. Thermally high prestressable glasses with high temperative shock resistance and thermal expansion coefficients in the temperature range 20°-300° C. of from 46.1 to 53.2×10$^{-7}$/°C., characterized in that the transformation temperatures (Tg) are from 596° to 621° C., the softening temperatures (Ew) are from 859° to 885° C., the working temperatures (V$_A$) are from 1288° to 1355° C., the temperature differential Ew-Tg is from 248° to 271° C., the thermal stress factor R is greater than 300 for undamaged glass surfaces under a quench blowing pressure of one bar and the ratio $\alpha'/\alpha$ of the thermal expansion coefficient above Tg ($\alpha'$) to expansion below Tg ($\alpha$) is from 4.3 to 5.8 whereby said glass exhibits a high compression prestressing and crumbles into small pieces upon forced fracture, wherein the composition of said glasses, in oxides percent by weight, consists essentially of:

| | |
|---|---|
| $SiO_2$ | 66.70–70.70 |
| $B_2O_3$ | 4.50–10.30 |
| $Al_2O_3$ | 10.00 |
| $Na_2O$ | 4.50–5.50 |
| CaO | 2.20–4.20 |
| MgO | 1.70–3.10 |
| BaO | 1.50–3.50 |
| ZnO | 0–3.00 |
| total CaO + MgO + BaO + ZnO | 8.50–10.30 and |
| $As_2O_3$ | 0.30. |

4. Thermally high prestressable glasses with high temperative shock resistance and thermal expansion coefficients in the temperature range 20°–300° C. of from 44.9 to 46.2×10⁻⁷/°C., characterized in that the transformation temperatures (Tg) are from 566° to 575° C., the softening temperatures (Ew) are from 844° to 864° C., the working temperatures ($V_A$) are from 1239° to 1287° C., the temperature differential Ew–Tg is from 274° to 298° C., the thermal stress factor R is greater than 300 for undamaged glass surfaces under a quench blowing pressure of one bar and the ratio $\alpha'/\alpha$ of the thermal expansion coefficient above Tg ($\alpha'$) to expansion below Tg ($\alpha$) is from 5.0 to 5.7 whereby said glass exhibits a high compression prestressing and crumbles into small pieces upon forced fracture, wherein the composition of said glasses, in oxides percent by weight, consists essentially of:

| | |
|---|---|
| $SiO_2$ | 65.70–68.70 |
| $B_2O_3$ | 6.00–6.30 |
| $Al_2O_3$ | 6.00 |
| $Na_2O$ | 4.00–5.00 |
| BaO | 5.00–8.9 |
| ZnO | 9.00–12.00 |
| total BaO + ZnO | 14.00–17.90 and |
| $As_2O_3$ | 0.30–0.50. |

* * * * *